United States Patent [19]
Onoda et al.

[11] 3,919,294
[45] Nov. 11, 1975

[54] PROCESS FOR PREPARING DIACETOXY BUTANE

[75] Inventors: Takeru Onoda, Yokohama; Akihisa Ohno, Kawasaki; Ken Shiraga, Kurashiki, all of Japan

[73] Assignee: Mitsubishi Chemical Industries Ltd., Tokyo, Japan

[22] Filed: Sept. 11, 1973

[21] Appl. No.: 396,334

[30] Foreign Application Priority Data
Sept. 11, 1972 Japan.............................. 47-91611

[52] U.S. Cl. .................................................. 260/491
[51] Int. Cl.² ............................................ C07C 67/28
[58] Field of Search ................................ 260/491

[56] References Cited
OTHER PUBLICATIONS
Chem. Abstracts, 76:33823t (1972).

*Primary Examiner*—Vivian Garner
*Attorney, Agent, or Firm*—Oblon, Fisher, Spivak, McClelland & Maier

[57] ABSTRACT

1,4-Diacetoxy butane is prepared by hydrogenating 1,4-diacetoxy-2-butene in the presence of a reduced nickel catalyst which contains zinc and/or vanadium.

7 Claims, No Drawings

PROCESS FOR PREPARING DIACETOXY BUTANE

BACKGROUND OF THE INVENTION

1. Field of the Invention

The present invention relates to an economically advantageous process for preparing 1,4-diacetoxy butane by hydrogenating 1,4-diacetoxy-2-butene in the presence of an improved reduced nickel catalyst.

2. Description of the Prior Art 1,4-Diacetoxy butane is important in the production of tetrahydrofuran which is very useful as a starting material for polymers and as a solvent. Various processes have been proposed for preparing 1,4-diacetoxy butane by the hydrogenation of 1,4-diacetoxy-2-butene which may be produced by reacting butadiene with acetic acid and oxygen. For example, in the specification of British Pat. No. 1,170,222 a reaction using a palladium catalyst on a charcoal, silica, alumina, or the like carrier is described and in West German Pat. No. 2,105,220 reactions using various palladium catalysts or a Raney nickel catalyst are described. According to these descriptions, hydrogenation catalysts other than palladium and Raney nickel are extremely low in reaction yield.

A palladium or nickel catalyst system is generally used for the hydrogenation of carbon-carbon unsaturation on an industrial scale. The palladium catalyst system is considered to be generally higher in activity than nickel catalyst systems based on the metal weight, although the palladium catalyst is considered to be several hundred times more expensive than the nickel catalyst. Therefore, a need exists for a nickel catalyst system which would have a sufficiently high activity and which could replace the palladium catalysts. If a high activity nickel catalyst could be obtained, it would provide certain other advantages, besides cost advantages, as compared with the palladium catalyst. When palladium catalysts are used, it is required that a relatively small amount be used on the carrier to achieve good dispersibility. In contrast, larger amounts of nickel catalysts can be readily dispersed on the carrier. Moreover, the palladium catalyst system is lower in resistance against poisoning and is inferior to the nickel catalyst system in catalytic life. It would thus be industrially advantageous to use a highly active nickel catalyst system as compared with the use of palladium catalyst systems.

Nickel catalyst systems can be generally classified according to the method of activation as Raney nickel type (including Urushibara's nickel), reduced nickel type and a decomposed organic acid nickel salt type. The Raney type catalyst can be activated with an alkaline solution, although the activation procedure is very complicated on an industrial scale. The decomposed organic acid nickel salt type catalyst is more difficult than the Raney type catalyst to prepare on an industrial scale. In addition, these catalysts are far inferior to reduced nickel catalyst systems from the economic standpoint. Therefore, when performing this reaction on an industrial scale, it is clearly most desirable to use a reduced nickel catalyst.

SUMMARY OF THE INVENTION

Accordingly, one object of this invention is to provide a hydrogenation process using a reduced nickel catalyst.

Another object of this invention is to provide a novel reduced nickel catalyst.

Yet another object of this invention is to provide a process for producing a reduced nickel catalyst containing zinc and/or vanadium.

Briefly, these and other objects of the invention are achieved by providing a reduced nickel catalyst system which is both high in activity and high in selectivity by adding zinc and/or vanadium to the nickel. That is, the present invention comprises a process for preparing 1,4-diacetoxy butane by catalytically hydrogenating 1,4-diacetoxy-2-butene in the presence of a catalyst containing zinc and/or vanadium and reduced nickel.

DETAILED DESCRIPTION OF THE PREFERRED EMBODIMENTS

The catalyst used in the present invention does not necessarily require a carrier, although it is preferable to use an appropriate carrier. Suitable carriers include activated carbon, silica gel, silica alumina, clay, bauxite, magnesia, diatomaceous earth, pumice or the like. The concentration of nickel carried on the carrier can be varied over a wide range, although it is generally effective in an amount above about 0.1 percent by weight of the total weight of catalyst plus carrier and, in particular, it is preferable to use from about 2 to 60 percent by weight. More than 60 percent by weight may be used, although it is not economical to use such a large amount.

The amount of the second component to be added to the nickel is dependent upon the second component used, although it is generally effective within the range of from about 0.01 to 1.0 in atomic ratio to the nickel. If the amount of the second component added is below this range, sufficient catalytic activity will not be obtained. The addition of the second component in an amount above this range will retard the hydrogenation ability of the nickel catalyst so that sufficient activity cannot be obtained.

The starting materials for preparing the nickel, and zinc and/or vanadium catalyst of the present invention should preferably be soluble in solvents such as water, mineral acid or organic acid. That is, the metals should be in the form of their corresponding nitrates, sulfates, halides, oxyacid salts, and the like.

The method of preparation of the catalyst used in the present invention is not particularly critical, and any conventional method commonly used for hydrogenation of catalysts may be used. For example, the catalyst may be prepared by supporting a nickel compound and a zinc compound and/or a vanadium compound on a carrier. The mixture is baked to form the corresponding oxides and then the oxides are reduced with a reducing agent until the nickel oxide is reduced to nickel metal. However, the zinc oxide and/or the vanadium oxide may still remain in the form of their oxides.

A conventional reducing agent, for example hydrogen, formalin, hydrazine, or the like, may be used, although, hydrogen is preferable. One method of preparation is shown as follows:

A carrier is immersed into a solution prepared by dissolving a quantity of a nickel compound and a second component of zinc and/or vanadium in a quantity of appropriate solvent. The immersed carrier is then taken from the solution, dried at 100°C for 3 hours and then baked at 400°C for 5 hours. The baking condition is not limited to the abovedescribed condition, but it is sufficient if it is such so that the compounds of the starting materials are decomposed to the oxides. After baking, the baked carrier is reduced in a gaseous stream of hydrogen at 400°C for 6 hours to obtain the catalyst of the present invention. The conditions of the reduction process are not critical and it is only necessary that the nickel oxide be reduced to nickel metal.

In another method for preparing the catalyst, a carrier is placed into an acidic solution of a nickel compound and a zinc compound and/or a vanadium compound. Subsequently, an alkaline solution such as ammonia or sodium hydroxide is added thereto to precipitate these compounds onto the carrier and after separating the solution the carrier is baked and reduced as described above.

The shape of the catalyst obtained is not particularly critical. When a carrier is not used, the catalyst may be molded to any desired shape and when using a carrier, any shape of carrier may be used. It is also possible to immerse a powdered carrier into the solution and mold it at the baking step.

The temperature of the hydrogenation reaction of the present invention is generally within the range of from about room temperature to about 200°C, although the preferable temperature for the hydrogenation reaction with a sufficient reaction velocity and good selectivity, is from 50° to 120°C.

The hydrogen pressure when the present hydrogenation reaction is performed is not particularly limited although the preferable hydrogen pressure for economically performing the hydrogenation with sufficient reaction velocity is from about 10 to 100 atms.

The reaction may be carried out in the liquid phase.

In the hydrogenation reaction of the present invention, it is possible to use a solvent although it is not particularly required. The solvent used is not particularly limited, although diacetoxy butane, alcohol, esters, hydrocarbons, and the like may be used.

As a practical aspect of the present invention, either a fixed bed type of reactor using a molded catalyst or an agitated type of reactor using a powdered catalyst may be used.

As described above, the present invention is to provide an economical process for preparing 1,4-diacetoxy butane in far higher yields than when a conventional reduced nickel catalyst is used. The present invention comprises hydrogenating 1,4-diacetoxy-2-butene in the presence of an improved reduced catalyst.

Having generally described the invention, a more complete understanding can be obtained by reference to certain specific examples, which are included for purposes of illustration only and are not intended to be limiting unless otherwise specified.

EXAMPLE 1

100 cc (bulk density: 0.5) of a molded carrier of diatomaceous earth (water absorption rate: 120 percent) 5 mm in diameter and 7 mm in length was immersed in 100 cc of an aqueous solution prepared by dissolving 41.3 g of nickel nitrate hexahydrate and 21.2 g of zinc nitrate hexahydrate in desalted water at 100°C, the immersed carrier was removed therefrom after standing overnight and dried in a stream of air at 100°C for 3 hours. After cooling, the carrier was reduced in a gaseous stream of hydrogen at 400°C for 6 hours to obtain the catalyst of the present invention. 16 g of the catalyst, 50 g of 1,4-diacetoxy-2-butene and 50 g of diacetoxy butane were charged into a shaker type autoclave having a volume of 200 cc and reacted under 60 atmospheres of hydrogen at 80°C for 90 minutes. The product was analyzed by gas chromatography. The result is as shown in Table I.

COMPARATIVE EXAMPLE 1

For the purpose of a comparison with Example 1, a catalyst was prepared in the same manner as in Example 1 except the zinc nitrate was not added. The same hydrogenation reaction as in Example 1 was performed. The analytical result of the product obtained is shown in Table 1.

EXAMPLE 2

A catalyst was prepared in the same manner as in Example 1 except ammonium vanadate was used instead of zinc nitrate hexahydrate and an aqueous solution of oxalic acid was used as a solvent and the same hydrogenation reaction as in Example 1 was also performed. The analytical result of the product obtained is shown in Table I.

TABLE I

Hydrogen Pressure = 60 atm.    Reaction temperature = 80°C
Reaction time = 90 minutes

| | Catalyst | | * | |
|---|---|---|---|---|
| | Second component, X | Ni/X (atomic ratio) | Specific reaction velocity | DAB Selectivity |
| Example 1 | Zn | 1/0.5 | 0.54 | 97.6 |
| Example 2 | V | 1/0.5 | 0.50 | 95.8 |
| Comparative Example | — | — | 0.30 | 94.2 |

*Specific reaction velocity is shown by a numerical value calculated from the hydrogen absorption curve taking the reaction for DAB (DAB" is an abbreviation of 1,4-diacetoxy-2-butene) as a zero-order reaction. DAB is an abbreviation for 1,4-diacetoxy butane.

As can be seen from Table I, the specific reaction velocity is greatly improved and the selectivity is also improved.

REFERENCE EXAMPLES 1 – 4

Catalysts were prepared in the same manner as in Example 1 except that 20.5 g of cobalt nitrate hexahydrate, 17.2 g of copper nitrate trihydrate, 28.8 g of ferric nitrate nonahydrate and 9.0 g of ammonium bichromate, respectively were used instead of zinc nitrate and the same hydrogenation reaction as in Example 1 was performed. The analytical result of the product obtained is shown in Table II.

TABLE II

| Reference Example | Catalyst | | * | |
|---|---|---|---|---|
| | Second component X | Ni/X (atomic ratio) | Specific reaction velocity | DAB selectivity |
| 1 | Cobalt | 1/0.5 | 0.33 | 95.0 |
| 2 | Copper | 1/0.5 | 0.18 | 95.8 |
| 3 | Iron | 1/0.5 | 0.29 | 91.0 |
| 4 | Chromium | 1/0.5 | 0.40 | 84.8 |

*Specific reaction velocity is shown with a numberical value calculated from the hydrogen absorption curve taking as the reaction for DAB" as a zero-order reaction.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing 1,4-diacetoxy butane, which comprises:

catalytically hydrogenating 1,4-diacetoxy-2-butene in the liquid phase in the presence of a metal catalyst selected from the group consisting of nickel and zinc; nickel, zinc and vanadium; and nickel and vanadium, wherein the atomic ratio of the zinc and vanadium components based on nickel ranges from 0.01 to 1.0.

2. The process of claim 1, wherein the catalyst is prepared by treating a composition consisting essentially of nickel oxide, and zinc oxide and/or vanadium oxide supported on a carrier with a reducing agent until the nickel oxide is reduced to a nickel metal.

3. The process of claim 2 wherein the composition consisting essentially of a nickel oxide and a zinc oxide and/or a vanadium oxide is prepared by supporting a nickel compound and a zinc compound and/or a vanadium compound on a carrier and subsequently baking them.

4. The process of claim 1, wherein the concentration of nickel in the catalyst is above 0.1 percent by weight.

5. The process of claim 1, wherein the reaction temperature is from room temperature to 200°C.

6. The process of claim 1, wherein the reaction is run under 10 to 100 atmospheres of hydrogen.

7. The process of claim 1, wherein diacetoxy butane or a hydrocarbon is used as a solvent.

* * * * *